United States Patent [19]

Kurita

[11] Patent Number: 4,496,696
[45] Date of Patent: Jan. 29, 1985

[54] SILICONE SEALANT COMPOSITION

[75] Inventor: Atsushi Kurita, Ota, Japan

[73] Assignee: Toshiba Silicone Co., Ltd., Tokyo, Japan

[21] Appl. No.: 560,071

[22] Filed: Dec. 9, 1983

[30] Foreign Application Priority Data

Dec. 15, 1982 [JP] Japan ................................ 57-220816

[51] Int. Cl.$^3$ ................................................. C08F 8/00
[52] U.S. Cl. ..................................... 525/479; 525/912; 525/920; 525/921; 525/922; 525/923; 525/924; 528/26; 528/27; 528/28; 528/901; 204/159.13
[58] Field of Search ............... 525/479, 912, 920, 921, 525/922, 923, 924; 528/26, 27, 28, 901; 204/159.13

[56] References Cited

U.S. PATENT DOCUMENTS

| 4,221,896 | 9/1980 | Endo | 528/28 |
| 4,374,950 | 2/1983 | Shimizu | 528/20 |

*Primary Examiner*—Melvyn I. Marquis
*Attorney, Agent, or Firm*—Gary L. Loser

[57] ABSTRACT

A silicone sealant composition comprising
(A) 100 parts by weight of a silanol terminated polydiorganosiloxane having a viscosity of 100 to 200,000 cSt at 25° C.,
(B) 0.1 to 30 parts by weight of an aminoxy group-containing organosilicon compound containing, on the average, more than two organoaminoxy groups per molecule,
(C) 5 to 300 parts by weight of an inorganic filler, and
(D) 1 to 30 parts by weight of an ultraviolet-curable oligomer containing acryl groups.

9 Claims, No Drawings

SILICONE SEALANT COMPOSITION

BACKGROUND OF THE INVENTION

The present application claims priority of Japanese patent application 82/220816 filed Dec. 15, 1982.

The present invention relates to a silicone sealant composition, and more particularly pertains to a silicone sealant composition which does not stain the circumference of a joint when used as a sealant for joint parts of building structures.

Polyorganosiloxane compositions which can be cured at room temperature to form a rubbery elastomer are widely used as construction sealants since they have excellent resistance to heat and weather and are relatively free of changes in physical properties due to extreme temperature or exposure to ozone or ultraviolet light.

These polyorganosiloxane compositions have excellent characteristics as mentioned above, but they have the disadvantage that not all of the polyorganosiloxane participates in crosslinking, that is, even after curing some is left behind, hence the circumference of a joint is stained by the exudation thereof.

Therefore, there are disadvantages that since dust is liable to be deposited on the surface of the joint where the polyorganosiloxane exudes and spreads, such dust adheres to the polyorganosiloxane and is also rendered water-repellent. Accordingly, the dust cannot be washed off by rain water and staining around the joint proceeds causing the beauty of the structure to be spoiled.

There has been proposed a method for preventing the circumference of the joint from being stained in Japanese Patent Laid-Open No. 102343/1982, wherein a polyorganosiloxane composed of $SiO_2$ units and $R_3{}^1Si$-$O_{178}$ units and containing silanol groups attached to the silicon atoms, in which $R^1$ is the same or different substituted or unsubstituted monovalent hydrocarbon groups, a silanol group-terminated polyorganosiloxane and a silicon compound containing organoaminoxy groups attached to the silicon atoms are dissolved in a volatile organosiloxane and an organic solvent, and the surface of a silicone sealant composition is coated therewith and cured to form a polysiloxane film on the surface of said sealing material composition, whereby polysiloxane which does not participate in crosslinking is prevented from exuding and spreading around the joint by the polysiloxane film.

The degree of staining around the joint can be considerably reduced by this method. However, since the film formed on the surface of the silicone sealant composition has good compatibility with the polyorganosiloxane exuding, it is impossible to completely prevent the polyorganosiloxane from exuding. Therefore, this method is not considered to be a preferred method.

The present applicant has developed a silicone sealant composition which is free from the disadvantages associated with conventional methods, and has found that the above mentioned disadvantages can be eliminated by incorporating a small amount of an ultraviolet-curable oligomer containing acryl groups in a polyorganosiloxane composition.

The present invention is based on this finding. An object of the present invention is to provide a silicone sealant composition which does not stain the circumference of the joint.

SUMMARY OF THE INVENTION

According to the present invention there is provided a silicone sealant composition comprising (A) 100 parts by weight of a silanol terminated polydiorganosiloxane having a viscosity of 100 to 200,000 cSt at 25° C., (B) 0.1 to 30 parts by weight of an aminoxy group-containing organosilicon compound containing, on the average, more than two organoaminoxy groups per molecule, (C) 5 to 300 parts by weight of an inorganic filler, and (D) 1 to 30 parts by weight of an ultraviolet-curable oligomer containing acryl groups.

DESCRIPTION OF THE INVENTION

The present invention provides a silicone sealant composition comprising (A) 100 parts by weight of a silanol terminated polydiorgansiloxane having a viscosity of 100 to 200,000 cSt at 25° C., (B) 0.1 to 30 parts by weight of an aminoxy group-containing organosilicon compound containing, on average, more than two organoaminoxy groups per molecule, (C) 5 to 300 parts by weight of an inorganic filler, and (D) 1 to 30 parts by weight of an ultraviolet-curable oligomer containing acryl groups.

The polydiorganosiloxane used as component (A) in the present invention is the same as a silanol terminated polydiorganosiloxane which is conventionally used in a room temperature vulcanizable polysiloxane composition, and must have a viscosity within the range of 100 to 200,000 cSt at 25° C. to impart proper workability and physical properties suitable for use as a building sealant composition. When the viscosity is lower than 100 cSt, physical properties required for the building sealant composition cannot be obtained and when the viscosity exceeds 200,000 cSt, no uniform silicone sealant composition can be obtained and extrusion workability is also lowered. Most preferably the viscosity is within the range of 500 to 50,000 cSt within which physical properties and extrusion workability are well balanced.

Examples of organic groups attached directly to the silicon atoms of the polydiorganosiloxane include alkyl groups such as methyl, ethyl, propyl, butyl and hexyl groups; alkenyl groups such as vinyl and allyl groups; aryl groups such as phenyl group; aralkyl groups such as styrenyl group; and monovalent substituted hydrocarbon groups such as 3,3,3-trifluoropropyl, chloromethyl and $\beta$-cyanoethyl groups. Among them, monovalent hydrocarbon groups such as methyl, vinyl and phenyl groups are preferred because of ease of synthesis.

It is more preferred that at least 85% of all the organic groups are methyl groups and most preferred that substantially all the organic groups be methyl groups. This is so because starting intermediates having methyl groups can be most easily obtained, and the methyl group gives the lowest viscosity for the degree of polymerization of the siloxane thereby ensuring a good balance between the extrusion workability and the physical properties of the silicone sealant composition. However, when resistance to low temperature and heat resistances are required it is preferred to use phenyl groups as part of the organic groups.

The aminoxy group-containing organosilicon compound used as component (B) in the present invention reacts with the terminal silanol groups of the polydiorganosiloxane of component (A) in a dehydroxylamine reaction to effect the crosslinking and the chain lengthening of said polysiloxane. The component (B) may by any silane derivative and cyclic, straight chain or branched siloxane derivatives. For the purpose of providing a silicone sealant composition having good reactivity and high extensibility in particular, it is preferred to use cyclic polysiloxanes containing two or three aminoxy groups per molecule.

Examples of organic groups attached to the aminoxy group include monovalent hydrocarbon groups such as methyl, ethyl, propyl, butyl or cyclohexyl groups or a bivalent hydrocarbon group such as butylene or pentene. Ethyl groups are preferred because of their ready availability as a starting material, ease of synthesis, reactivity and easy evaporation for releasing organohydroxylamine.

Examples of the aminoxy group-containing organosilicon compounds include the following compounds, wherein the following abbreviations are used for brevity's sake:

Me: Methyl Group,
Et: Ethyl Group,
Bu: Butyl Group
Vi: Vinyl Group
Ph: Phenyl Group.

Si(ONEt$_2$)$_4$
MeSi(ONEt$_2$)$_3$
PhSi(ONMe$_2$)$_3$
PhSi(ONEt$_2$)$_3$

MeSi(ON⌐(CH$_2$)$_4$⌐)$_3$ (Et$_2$NO)(Me)$_2$SiSi(Me)$_2$(ONEt$_2$)
(Et$_2$NO)(Me$_2$)SiOSi(Me$_2$)(ONEt$_2$)
(Et$_2$NO)(Et)$_2$SiO(Ph)$_2$SiOSi(Me)$_2$(ONEt$_2$)

Me$_3$SiO(MeSiO)$_2$SiMe$_3$
        |
        ONEt$_2$ (MeSiO)$_4$
  |
  ONEt$_2$

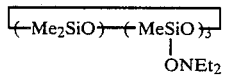
(Me$_2$SiO)—(MeSiO)$_3$
          |
          ONEt$_2$

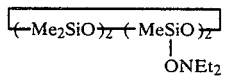
(Me$_2$SiO)$_2$—(MeSiO)$_2$
          |
          ONEt$_2$

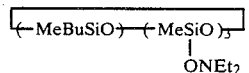
(MeBuSiO)—(MeSiO)$_3$
          |
          ONEt$_2$

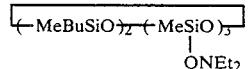
(MeBuSiO)$_2$—(MeSiO)$_3$
          |
          ONEt$_2$

MeSi(OMe$_2$SiONEt$_2$)$_3$

PhSi(OMe$_2$SiONEt$_2$)$_3$

The aminoxy group-containing organosilicon compound is used in an amount of 0.1 to 30 parts by weight, preferably 1 to 15 parts by weight per 100 parts by weight of component (A). When the amount of this compound is less than 0.1 part by weight, the reaction rate thereof with the silanol terminated polydiorganosiloxane is increased so that no sufficient working time can be obtained, while when it exceeds 30 parts by weight, the elasticity of the resulting silicone sealant composition is lowered. Thus such an amount is not preferred.

Component (C) used in the present invention is any filler which imparts proper flowability or non-flowability to the silicone sealant composition according to the purpose and conditions of use. Such fillers are capable of giving the hardness and mechanical strength required for use as a building silicone sealant composition. Component (C) can be any fine inorganic powder but fillers such as fumed silica, precipitated silica, silica aerogel, ground silica, diatomaceous earth, iron oxide, titanium oxide and calcium carbonate are preferred. Among them calcium carbonate is particularly preferred since it can readily provide a silicone sealant composition having high elasticity. These inorganic fillers may be used either alone or as an arbitrary mixture of them.

The inorganic filler is used in an amount of 5 to 300 parts by weight, and preferably from 30 to 200 parts by weight per 100 parts by weight of component (A). When the amount of component (C) is less than 5 parts by weight, physical properties required for silicone construction sealant compositions cannot be imparted to the composition whereas when it exceeds 300 parts by weight workability becomes poor.

The ultraviolet-curable oligomer containing acryl groups used as component (D) in the present invention serves to prevent the circumference of a joint from being stained in that the oligomer exudes from inside the silicone sealant composition and forms a cured film by the ultraviolet light of the sunlight. This prevents the polysiloxane which does not take part in crosslinking from exuding from inside the silicone composition and diffusing around the joint.

Examples of the ultraviolet-curable oligomers containing acryl groups include polyol acrylates, polyether acrylates, polyester acrylates, urethane acrylates, epoxy acrylates, spiran resins, diene acrylates and melamine acrylates. Among them, polyester acrylates, epoxy acrylates and urethane acrylates are particularly suitable for use as component (D) in the present invention, since their photo-curing rate is high, their films after curing can easily follow the movement of the joint, and the cured materials have relatively well-balanced physical properties.

Preferably component (D) is used in an amount of from 1 to 30 parts by weight per 100 parts by weight of component (A). When the amount of component (D) is less than 1 part by weight, the amount of the ultraviolet-curable oligomer containing acryl groups exuding from the silicone composition to the surface thereof is too small to prevent the uncrosslinked polysiloxane from exuding from inside the silicone sealant composition. When it exceeds 30 parts by weight there can be obtained a silicone sealant composition which, after being cured, is hard, less extensible and unsuitable for applying to a joint. Thus such an amount is not preferred.

A photoinitiator may be used together with the ultraviolet-curable oligomer containing acryl groups of the present invention to rapidly obtain the cured film on the surface of the composition. Examples of the photoinitiators include benzophenone, acetophenone, benzoin methyl ether, benzoin ethyl ether, benzoin isopropyl ether, benzoin isobutyl ether, benzoin octyl ether, 2,2-dimethoxy-2-phenylacetophenone, 2,2-diethoxyacetophenone, 1-phenyl-1,2-propanedione 2-(O-ethoxycarbonyl) oxime, 1-phenyl-1,2-propanedione 2-(O-benzoyl) oxime, 2-hydroxy-2-methylpropiophenone, 4'-isopropyl-2-hydroxy-2-methylpropiophenone, benzil, methyl o-benzoylbenzoate, and 4,4'-bisdiethylaminobenzophenone. These initiators are used in an amount of not more than 5 parts by weight per 100 parts by weight of the ultraviolet-curable oligomer containing acryl groups.

Further, pigment such as titanium oxide, cobalt oxide, red iron oxide, carbon black or phthalocyanine pigment in an amount usual for a colorant may be incorporated in the composition of the present invention.

In the joint of a building structure which is sealed with the silicone sealant composition of the present invention the ultraviolet-curable oligomer containing acryl groups exudes to the surface thereof after the curing of the silicone sealant composition, and forms a cured film by the ultraviolet light of the sunlight. Therefore the polyorganosiloxane can scarcely exude from inside the silicone sealant composition toward the surface of the joint. Further, since the film formed on the surface is crosslinked by the ultraviolet light, its crosslink density is low and the film is elastic so that the film is not cracked by the movement of the joint.

Since the oligomer slowly exudes from the silicone sealant composition to form a surface film, the film is extremely thin and there is no fear of peeling and dropping off. Hence staining around the joint can be completely prevented.

Accordingly the silicone sealant composition of the present invention is suitable for use as a sealant composition for the joints of building structures employing wall materials liable to be stained, such as building stones, e.g. granite and marble, tile and enamel.

EXAMPLES

The following examples further illustrate the present invention. In the following examples and comparative examples parts are by weight unless otherwise stated.

Examples 1 to 5

65 parts of rosin acid-treated colloidal calcium carbonate having an average particle size of 0.6μ was mixed with 100 parts of a silanol terminated polydimethylsiloxane having a viscosity of 3,000 cSt at 25° C. by means of a kneader to obtain a base compound. Then 3.5 parts of a mixture consisting of 95% by weight of the compound of formula

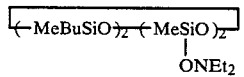

and 5% by weight of the compound of formula

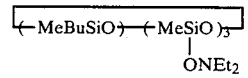

and an ultraviolet-curable oligomer containing acryl groups given in Table 1 were mixed with 100 parts of said base compound to obtain a silicone sealant composition. Comparative Example 1 in Table 1 shows a case where no ultraviolet-curable oligomer containing acryl groups was added.

TABLE 1

| Component (D) | Example (parts) 1 | 2 | 3 | 4 | 5 | Comp. Ex. 1 |
|---|---|---|---|---|---|---|
| *1 | 5 | | | | | |
| *2 | | 25 | | | | |
| *3 | | | 10 | | | |
| *4 | | | | 20 | | |
| *5 | | | | | 15 | |

In this Table, *1 to *5 refer to the following ultraviolet-curable oligomers containing acryl groups respectively.

*1 Aronix M-7100; A$\left(\text{X}-\text{Y}\right)_{\overline{n}}$X—A, where A is an acryl group, X is a polyalcohol and Y is a polybasic acid and the viscosity is 8000 to 12,000 centipoise at 25° C.

*2 Aronix M-8030; which has the same general formula as above but wherein the viscosity is from 500 to 1100 centipoise at 25° C.

*3 Denacol Acrylate DA-314

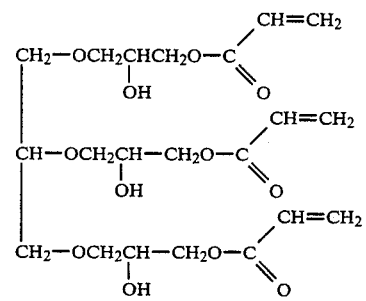

*4 Denacol Acrylate DA-911;

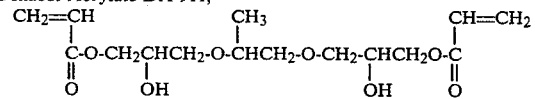

$CH_2=CHCOO-R^1-OOCNH-$
$\left(R-NHCOO-(polyol)-OOCNH\right)_{\overline{n}}$
$-R-NHCOO-R^1-OOCCH=CH_2$, where the viscosity ranges from 80,000 to 120,000 centipoise at 50° C.

*5 Aronix M-1100
*1, *2, *5 Products of Toa Gosei Kagaku Kogyo K.K
*3, *4 Products of Nagase Sangyo K.K.

The sealing of the joints of wall materials was conducted by using the silicone sealant compositions obtained in the above examples.

(Application Example I-I)

Each of the silicone sealant compositions of Examples 1 to 5 and Comparative Example 1 were applied to a joint between two sheets of unglazed tiles 30 cm in length, 20 cm in width, and 15 mm in thickness to prepare specimens which were then exposed outdoors.

The silicone sealant composition was 24 mm in width and 12 mm in thickness.

One, three, six and twelve months after exposure the degree of the staining on the surface of the tile was determined as Munsell value. The results are shown in Table 2.

TABLE 2

|  |  | Example |  |  |  |  | Comp. Ex. |
|---|---|---|---|---|---|---|---|
|  |  | 1 | 2 | 3 | 4 | 5 | 1 |
| after 1 month |  |  |  |  |  |  |  |
| distance from | 5 cm | N—9.5 | N—9.5 | N—9.5 | N—9.5 | N—9.5 | N—9.5 |
| end of joint | 10 cm | " | " | " | " | " | " |
|  | 15 cm | " | " | " | " | " | " |
| after 3 months |  |  |  |  |  |  |  |
| distance from | 5 cm | N—9.0 | N—9.0 | N—9.0 | N—9.0 | N—9.0 | N—8.5 |
| end of joint | 10 cm | " | " | " | " | " | N—9.0 |
|  | 15 cm | " | " | " | " | " | " |
| after 6 months |  |  |  |  |  |  |  |
| distance from | 5 cm | N—9.0 | N—9.0 | N—9.0 | N—9.0 | N—9.0 | N—8.0 |
| end of joint | 10 cm | " | " | " | " | " | N—8.5 |
|  | 15 cm | " | " | " | " | " | N—9.0 |
| after 12 months |  |  |  |  |  |  |  |
| distance from | 5 cm | N—9.0 | N—9.0 | N—9.0 | N—9.0 | N—9.0 | N—7.5 |
| end of joint | 10 cm | " | " | " | " | " | N—8.0 |
|  | 15 cm | " | " | " | " | " | " |

Application Example I-II

Two sheets of mortar were opposed to each other and each of the silicone sealant compositions of Examples 1 to 5 were applied to the joint therebetween to prepare specimens.

The mortar was 50 mm in width and the silicone sealant composition was 12 mm in both thickness and width.

These specimens were cured for three days at ordinary temperature to harden them.

Then they were placed in a weather meter in such a manner that the surface of the silicone sealant composition was irradiated with ultraviolet light. After the irradiation was conducted for 500 hours the specimens were repeatedly mounted on a fatigue testing machine and subjected to a displacement of +10% 5,000 times to examine the occurrence of surface anomalies of the silicone sealant composition. It was found that none of the specimens suffered anomalies such as cracking.

Application Example I-III

Each of the silicone sealant compositions of Examples 1 to 5 was applied to the joint (12 mm in width and 9 mm in depth) of a building structure employing, as an outer wall material, burner-finished granite backed with concrete.

Twelve months after the application, the surface condition was examined. No spoiling due to flushing water, staining, etc. was found around the joint in any of the specimens.

Examples 6 to 10

50 parts of ground limestone having an average particle size of 1μ and 50 parts of stearic acid-treated precipitated calcium carbonate having an average particle size of 0.2μ were mixed with 100 parts of silanol terminated polydimethylsiloxane having a viscosity of 5,000 cSt at 25° C. by means of a kneader to obtain a base compound. 3.0 parts of a mixture consisting of 94% by weight of a compound of the formula

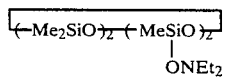

and 6% by weight of a compound of the formula

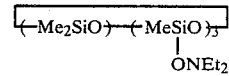

and an ultraviolet-curable oligomer containing acryl groups given in Table 3 were mixed with 100 parts of said base compound to obtain a silicone sealing material composition.

Comparative Example 2 in Table 3 shows a case where no ultraviolet-curable oligomer containing acryl groups was added.

TABLE 3

| Component (D) | Example (parts) | | | | | Comp. Ex. |
|---|---|---|---|---|---|---|
|  | 6 | 7 | 8 | 9 | 10 | 2 |
| *6 | 10 |  |  |  |  |  |
| *7 |  | 25 |  |  |  |  |
| *3 |  |  | 20 |  |  |  |
| *8 |  |  |  | 15 |  |  |
| *9 |  |  |  |  | 5 |  |

6* Aronix M-8060 $A\!-\!(X\!-\!Y)_{\overline{n}}\!X\!-\!A$, where A is an acryl group, X is a polyalcohol and Y is a polybasic acid and the viscosity is from 7000 to 13,000 centipoise at 25° C.
*7 Aronix M-8100; which has the same general formula as above and wherein the viscosity is from 8000 to 12,000 centipoise at 25° C.
*8 Denacol Acrylate DA-721;

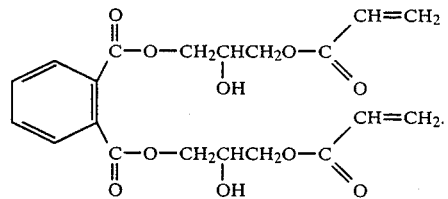

*9 Aronix M-1200 $CH_2\!=\!CHCOO\!-\!R'\!-\!OOCNH\!-\!(R\!-\!NHCOO\!-\!(polyol)\!-\!OOCNH)_{\overline{n}}\!-\!R\!-\!NHCOO\!-\!R^1\!-\!OOCCH\!=\!CH_2$, where the viscosity ranges from 200,000 to 300,000 centipoise at 50° C.
*6, *7, *9 Products of Toa Gosei Kagaku Kogyo K.K.
*8 A product of Nagase Sangyo K.K.

The sealing of the joints of wall materials was conducted by using the silicone sealant compositions obtained in the above examples.

Application Example II-I

Each of the silicone sealant compositions obtained in Examples 6 to 10 and the sealing material composition obtained in Comparative Example 2 were applied to the joint between two sheets of granite (Inada, burner-finished) 50 cm in length, 15 cm in width and 25 mm in thickness to prepare specimens which were then exposed outdoors. One, three and six months after exposure water repellency was examined by sprinkling water over the surface of the granite. The results are shown in Table 4.

TABLE 4

| Water repellency | Example | | | | | Comp. Ex. |
|---|---|---|---|---|---|---|
| of granite surface | 6 | 7 | 8 | 9 | 10 | 2 |
| After 1 month | no | no | no | no | no | slight |
| After 3 months | no | no | no | no | no | small |
| After 6 months | no | no | no | no | no | high |

Application Example II-II

Two sheets of mortar were opposed to each other and each of the silicone sealant compositions obtained in Examples 6 to 10 were applied to the joint therebetween to prepare specimens. The specimens were cured at ordinary temperature for three days to harden them.

Then they were placed in a weather meter in such a manner that the surface of the silicone sealant composition was irradiated with ultraviolet light. After the irradiation was conducted for 500 hours the specimens were repeatedly mounted on a fatigue testing machine and subjected to a displacement of ±10% 5,000 times to examine the occurrence of surface anomalies of the silicone sealant composition. It was found that none of the specimens suffered anomalies such as cracking.

Application Example II-III

Each of the silicone sealant compositions obtained in Examples 6 to 10 was applied to the joint (15 mm in width and 10 mm in depth) of a building structure employing a white enameled plate as an outer wall material. Eighteen months after application the specimens were examined, but no spoiling was found around the joint in any of the specimens.

Example 11

60 parts of rosin acid-treated colloidal calcium carbonate having an average particle size of 0.6μ was blended with 100 parts of silanol terminated polydimethylsiloxane having a viscosity of 20,000 cSt at 25° C. by means of a kneader. 15 parts of the ultraviolet-curable acrylic oligomer of the aforementioned *2 was blended therewith by means of a kneader to obtain a base compound which was then left to stand in the dark at room temperature. Thereafter the occurrence of separation of Aronix M-8030 was examined to find out that no separation occurred.

After the base compound was left to stand for 12 months, 4.0 parts of a crosslinking agent mixture consisting of 95% by weight of the compound of formula

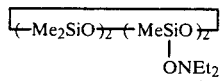

and 5% by weight of the compound of formula

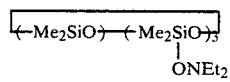

was mixed therewith to obtain a silicone sealant composition. This sealing material composition was applied to the joint between two sheets of granite (Inada, burner-finished) 50 cm in length, 15 cm in width, and 25 mm in thickness, which was then exposed outdoors. Twelve months after exposure the water repellency was examined by sprinkling water over the surface of the granite to find out that there was no water repellency at all.

I claim:
1. A silicone sealant composition comprising
   (A) 100 parts by weight of a silanol terminated polydiorganosiloxane having a viscosity of 100 to 200,000 cSt at 25° C.,
   (B) 0.1 to 30 parts by weight of an aminoxy group-containing organosilicon compound containing, on the average, more than two organoaminoxy groups per molecule,
   (C) 5 to 300 parts by weight of an inorganic filler, and
   (D) 1 to 30 parts by weight of an ultraviolet-curable oligomer containing acryl groups.
2. A silicone sealant composition as set forth in claim 1, wherein the polydiorganosiloxane (A) has a viscosity of 500 to 50,000 cSt at 25° C.
3. A silicone sealant composition as set forth in claim 1 or claim 2 wherein at least 85% of organic groups attached directly to the silicon atoms of the polydiorganosiloxane are methyl groups.
4. A silicone sealant composition as set forth in claim 1 or claim 2 wherein substantially all the organic groups attached directly to the silicon atoms of the polydiorganosiloxane are methyl groups.
5. A silicone sealant composition as set forth in claim 1 wherein the organoaminoxy group of the aminoxy-group-containing organosilicon compound is a diethylaminoxy group.
6. A silicone composition as set forth in claim 1 wherein the inorganic filler is calcium carbonate.
7. A silicone sealant composition as set forth in claim 1, claim 5 or claim 6 wherein the ultraviolet-curable oligomer containing acryl groups is polyester acrylate.
8. A silicone sealing material composition as set forth in claim 1, claim 5, or claim 6 wherein the ultraviolet-curable oligomer containing acryl groups is epoxy acrylate.
9. A silicone sealant composition as set forth in claim 1, claim 5 or claim 6 wherein the ultraviolet-curable oligomer containing acryl groups is urethane acrylate.

* * * * *